(12) United States Patent
Pinarbasi et al.

(10) Patent No.: US 6,636,400 B2
(45) Date of Patent: Oct. 21, 2003

(54) MAGNETORESISTIVE HEAD HAVING IMPROVED HARD BIASING CHARACTERISTICS THROUGH THE USE OF A MULTI-LAYERED SEED LAYER INCLUDING AN OXIDIZED TANTALUM LAYER AND A CHROMIUM LAYER

(75) Inventors: Mustafa Pinarbasi, Morgan Hill, CA (US); James Mac Freitag, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 09/955,440

(22) Filed: Sep. 18, 2001

(65) Prior Publication Data

US 2003/0058586 A1 Mar. 27, 2003

(51) Int. Cl.$^7$ ................................................. G11B 5/39
(52) U.S. Cl. .................... 360/324.12; 360/324
(58) Field of Search .................... 360/324–324.2, 360/327.1, 327.3, 327.31

(56) References Cited

U.S. PATENT DOCUMENTS

| | | | |
|---|---|---|---|
| 4,914,538 A | 4/1990 | Howard et al. | 360/322 |
| 5,018,037 A | 5/1991 | Krounbi et al. | 360/327.31 |
| 5,668,688 A | 9/1997 | Dykes et al. | 360/324.1 |
| 5,696,654 A * | 12/1997 | Gill et al. | 360/315 |
| 5,748,416 A | 5/1998 | Tobise et al. | 360/324.12 |
| 5,883,764 A | 3/1999 | Pinarbasi | 360/322 |
| 5,959,810 A | 9/1999 | Kakihara et al. | 360/324.12 |
| 6,128,167 A | 10/2000 | Saito et al. | 360/327.12 |
| 6,157,526 A * | 12/2000 | Watanabe et al. | 360/324.12 |
| 6,185,078 B1 | 2/2001 | Lin et al. | 360/324.12 |
| 6,185,081 B1 | 2/2001 | Simion et al. | 360/327.3 |
| 6,187,408 B1 | 2/2001 | Bian et al. | 428/65.3 |
| 6,197,164 B1 | 3/2001 | Pinarbasi | 204/192.11 |
| 6,201,671 B1 | 3/2001 | Pinarbasi | 360/324.11 |
| 6,208,492 B1 | 3/2001 | Pinarbasi | 360/324.11 |
| 6,219,207 B1 | 4/2001 | Pinarbasi | 360/322 |
| 6,219,210 B1 | 4/2001 | Pinarbasi | 360/324.11 |
| 6,258,468 B1 | 7/2001 | Mahvan et al. | 428/679 |
| 6,452,761 B1 * | 9/2002 | Carey et al. | 360/320 |
| 2002/0093773 A1 | 7/2002 | Pinarbasi | 360/322 |

FOREIGN PATENT DOCUMENTS

| | | |
|---|---|---|
| JP | 9097409 | 4/1997 |
| JP | 10154619 | 6/1998 |
| JP | 2000-306218 | 2/2000 |
| JP | 2000-132817 | 5/2000 |

OTHER PUBLICATIONS

Author Unknown, "Continuous Spacer Spin Valve Structure", IBM Technical Disclosure Bulletin (TBD), Apr. 1996, pp. 147–149, vol. 39, No. 04.

Sharma et al., "Effect of Seedlayer and Junction Geometry on Permanent Magnet Stabilization of Magnetoresistive Heads", IEEE Transactions On Magnets, Sep. 2000, pp. 2496–2498, vol. 36, No. 5.

* cited by examiner

*Primary Examiner*—Jefferson Evans
(74) *Attorney, Agent, or Firm*—John J. Oskorep

(57) ABSTRACT

A magnetic head with improved hard magnet properties includes a read sensor; a multi-layered seed layer formed adjacent to the read sensor and over a contiguous junction region of the read sensor; and a hard bias layer formed over the multi-layered seed layer. The multi-layered seed layer includes a first seed layer of oxidized tantalum and a second seed layer of chromium. The contiguous junction region exposes one or more sensor materials such as tantalum, nickel-iron, cobalt-iron, copper, platinum-manganese and ruthenium. The hard bias layer is preferably cobalt-platinum-chromium.

20 Claims, 9 Drawing Sheets

MAGNETORESISTIVE HEAD HAVING IMPROVED HARD BIASING CHARACTERISTICS THROUGH THE USE OF A MULTI-LAYERED SEED LAYER INCLUDING AN OXIDIZED TANTALUM LAYER AND A CHROMIUM LAYER

BACKGROUND OF THE INVENTION

1. Field of the Invention

This invention relates generally to magnetic transducers for reading information signals from a magnetic medium and to methods of making the same.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read (MR) sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which the MR element resistance varies as the square of the cosine of the angle between the magnetization of the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material (e.g., nickel-iron, cobalt, or nickel-iron-cobalt) separated by a layer of nonmagnetic material (e.g., copper) are generally referred to as spin valve (SV) sensors manifesting the SV effect. In an SV sensor, one of the ferromagnetic layers, referred to as the pinned layer, has its magnetization typically pinned by exchange coupling with an antiferromagnetic (e.g., nickel-oxide or iron-manganese) layer.

The magnetization of the other ferromagnetic layer, referred to as the free layer, however, is not fixed and is free to rotate in response to the field from the information recorded on the magnetic medium (the signal field). In the SV sensors, SV resistance varies as the cosine of the angle between the magnetization of the pinned layer and the magnetization of the free layer. Recorded data can be read from a magnetic medium because the external magnetic field from the recorded magnetic medium (the signal field) causes a change in direction of magnetization in the free layer, which in turn causes a change in resistance of the SV sensor and a corresponding change in the sensed current or voltage.

In addition to the magnetoresistive material, the MR sensor has conductive lead structures for connecting the MR sensor to a sensing means and a sense current source. Typically, a constant current is sent through the MR sensor through these leads and the voltage variations caused by the changing resistance are measured via these leads.

To illustrate, FIG. 1 shows a prior art SV sensor 100 comprising end regions 104 and 106 separated by a central region 102. A free layer (free ferromagnetic layer) 110 is separated from a pinned layer (pinned ferromagnetic layer) 120 by a non-magnetic, electrically-conducting spacer 115. The magnetization of pinned layer 120 is fixed by an antiferromagnetic (AFM) layer 121, which is formed on a gap layer 123 residing on a substrate 180. Cap layer 108, free layer 110, spacer layer 115, pinned layer 120, and AFM layer 121 are all formed in central region 102.

Conventionally, hard magnets are formed in end regions 104 and 106 in order to stabilize free layer 110. These hard magnets are typically formed of a cobalt-based alloy which is sufficiently magnetized and perhaps shielded so that the magnetic fields of the media and/or the write head do not effect the magnetism of the hard magnets. To perform effectively, the hard magnets should have a high coercivity, a high MrT (magnetic remanence×thickness), and a high in-plane squareness on the magnetization curve. A preferred cobalt-based alloy for the hard magnet is cobalt-platinum-chromium.

Thus, as illustrated in FIG. 1, hard bias layers 130 and 135 are formed in end regions 104 and 106, respectively, and provide longitudinal bias for free layer 110. Leads 140 and 145 are formed over hard bias layers 130 and 135, respectively. Hard bias layers 130 and 135 and lead layers 140 and 145 abut first and second side edges of the read sensor in a connection which is referred to in the art as a "contiguous junction". A sensor tail at the contiguous junction is formed from materials such as tantalum, nickel-iron, cobalt-iron, copper, platinum-manganese and ruthenium.

Leads 140 and 145 provide electrical connections for the flow of the sensing current Isfrom a current source 160 to the MR sensor 100. Sensing means 170 connected to leads 140 and 145 sense the change in the resistance due to changes induced in the free layer 110 by the external magnetic field (e.g., field generated by a data bit stored on a disk). One material for constructing the leads in both the AMR sensors and the SV sensors is a highly conductive material, such as a metal.

As illustrated in the graph of FIG. 2, the preferred hard magnet material (i.e., cobalt-platinum-chromium) on gap alumina or glass exhibits favorable properties for sensor biasing purposes. As shown, however, these properties degrade when deposited on materials forming the sensor tail in the contiguous junction region (e.g., tantalum, nickel-iron, cobalt-iron, copper, ruthenium, etc.). Unfortunately, if the sensor tail is too long, magnetic instability will result.

Referring ahead to FIG. 9, a close-up view is shown of SV sensor 100 with a contiguous junction 906 and a sensor tail 908. Sensor tail 908 exposes several layers and materials including cobalt-iron 920, ruthenium 922, cobalt-iron 924, copper 926, cobalt-iron 928, nickel-iron 930, tantalum 932, as well as platinum-manganese, iridium-manganese, and nickel-oxide in AFM layer 121 and other materials of a sensor seed layer 918. FIG. 9 illustrates more particularly one approach that was taken to improve the hard magnet properties of hard bias layer 135, which was to include a bi-layer seed layer 910 underneath it. Bi-layer seed layer 910 included a first seed layer 902 consisting of tantalum and a second seed layer 904 consisting of chromium.

Although improved hard magnet properties were exhibited with use of bi-layer seed layer 910 of FIG. 9, relatively thick seed layers (e.g., approximately 30 Angstroms of tantalum and 35 Angstroms of chromium) were required in order to achieve them. Such thick seed layers are undesirable because they increase the spacing between the hard magnet and the free layer, thereby decreasing the effectiveness of the hard magnet.

Accordingly, what are needed are methods and apparatus for improving hard magnet properties in magnetoresistive read heads that do not require the use of thick seed layers.

SUMMARY OF THE INVENTION

We have discovered that by utilizing a bi-layered seed layer consisting of oxidized tantalum and chromium over a contiguous junction region of a read sensor, improved hard magnetic properties are exhibited by the hard bias material. In particular, the hard bias material exhibits a high coercivity. Advantageously, the bi-layered seed layer need not be a thick layer but can be relatively thin as the high-level of coercivity achieved is fairly insensitive to the thickness of the tantalum.

More specifically, an inventive magnetic head having improved hard magnet properties includes a read sensor; a multi-layered seed layer formed adjacent the read sensor and over a contiguous junction region of the read sensor; and a hard bias layer formed over the multi-layered seed layer. The multi-layered seed layer includes a first seed layer comprising oxidized tantalum; and a second seed layer comprising chromium. The hard bias layer is made from a cobalt-based alloy, such as cobalt-platinum-chromium. The contiguous junction region exposes one or more sensor materials such as tantalum, nickel-iron, cobalt-iron, copper, platinum-manganese and ruthenium. Preferably, the first seed layer has a thickness of less than 30 Angstroms and the hard bias layer produces a coercivity of about 700 Oersteds or higher. A lead layer may be formed over the hard bias layer.

A magnetic recording device may embody the magnetic head. This magnetic recording device has at least one rotatable magnetic disk; a spindle supporting the at least one rotatable magnetic disk; a disk drive motor for rotating the at least one rotatable magnetic disk; a magnetic head for reading data from the at least one rotatable magnetic disk; and a slider for supporting the magnetic head. The magnetic head has a read sensor; a multi-layered seed layer formed adjacent the read sensor and over a contiguous junction region of the read sensor; and a hard bias layer formed over the multi-layered seed layer. The multi-layered seed layer includes a first seed layer comprising oxidized tantalum; and a second seed layer comprising chromium. The hard bias layer is made from a cobalt-alloy, such as cobalt-platinum-chromium. The contiguous junction region exposes one or more sensor materials such as tantalum, nickel-iron, cobalt-iron, copper, platinum-manganese and ruthenium.

Finally, a method of producing a magnetic head includes the acts of forming an oxidized tantalum seed layer adjacent to a read sensor and over a contiguous junction region of the read sensor by depositing a tantalum layer adjacent to and over the contiguous junction region and then oxidizing the tantalum seed layer to produce the oxidized tantalum seed layer; depositing a chromium seed layer over the oxidized tantalum seed layer; and then depositing a hard bias layer over the chromium seed layer. The contiguous junction region exposes one or more sensor materials such as tantalum, nickel-iron, cobalt-iron, copper, platinum-manganese and ruthenium. The act of depositing the tantalum layer adjacent to and over the contiguous junction region involves depositing a tantalum layer of less than 30 Angstroms. The act of depositing the hard bias layer involves depositing a hard bias layer of cobalt-platinum-chromium. The method may include the further act of depositing a lead layer over the hard bias layer.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
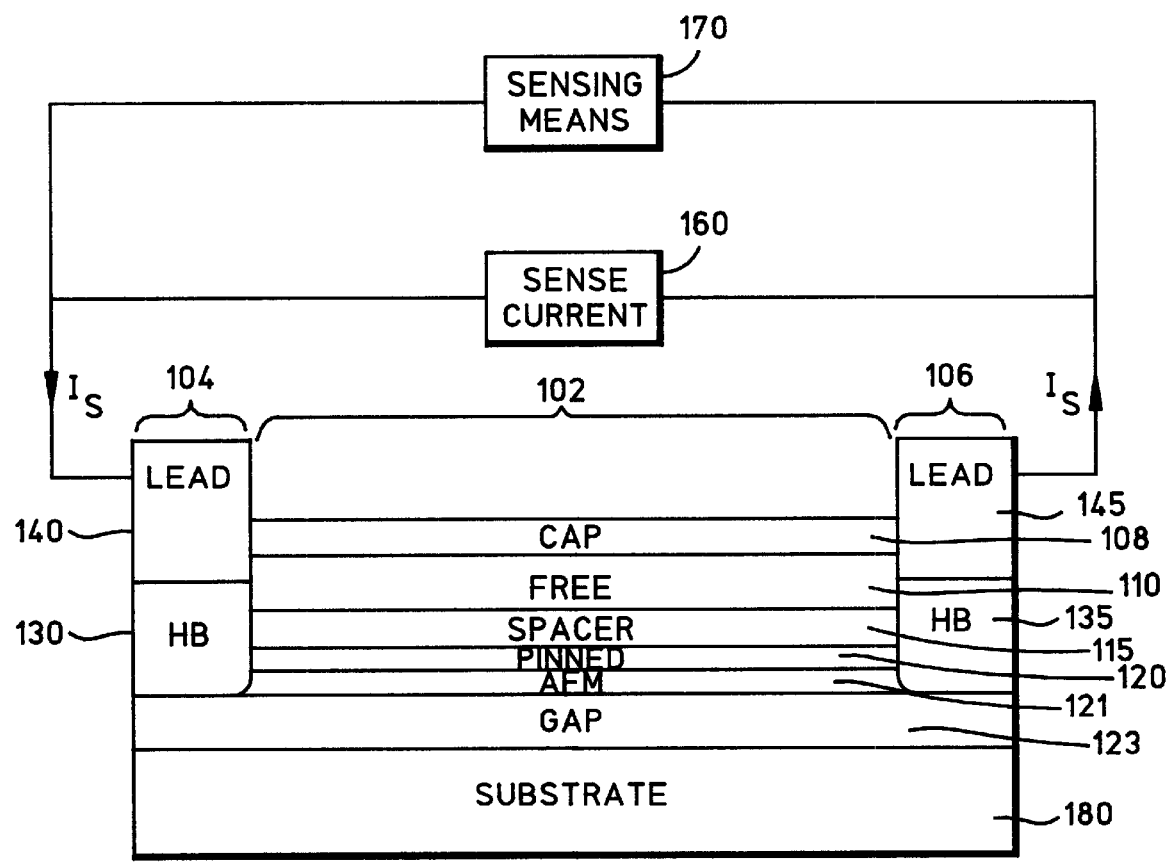
FIG. 1 is a schematic diagram of an air-bearing surface (ABS) view of the thin film structure of a prior art SV sensor device.
Figure 2:
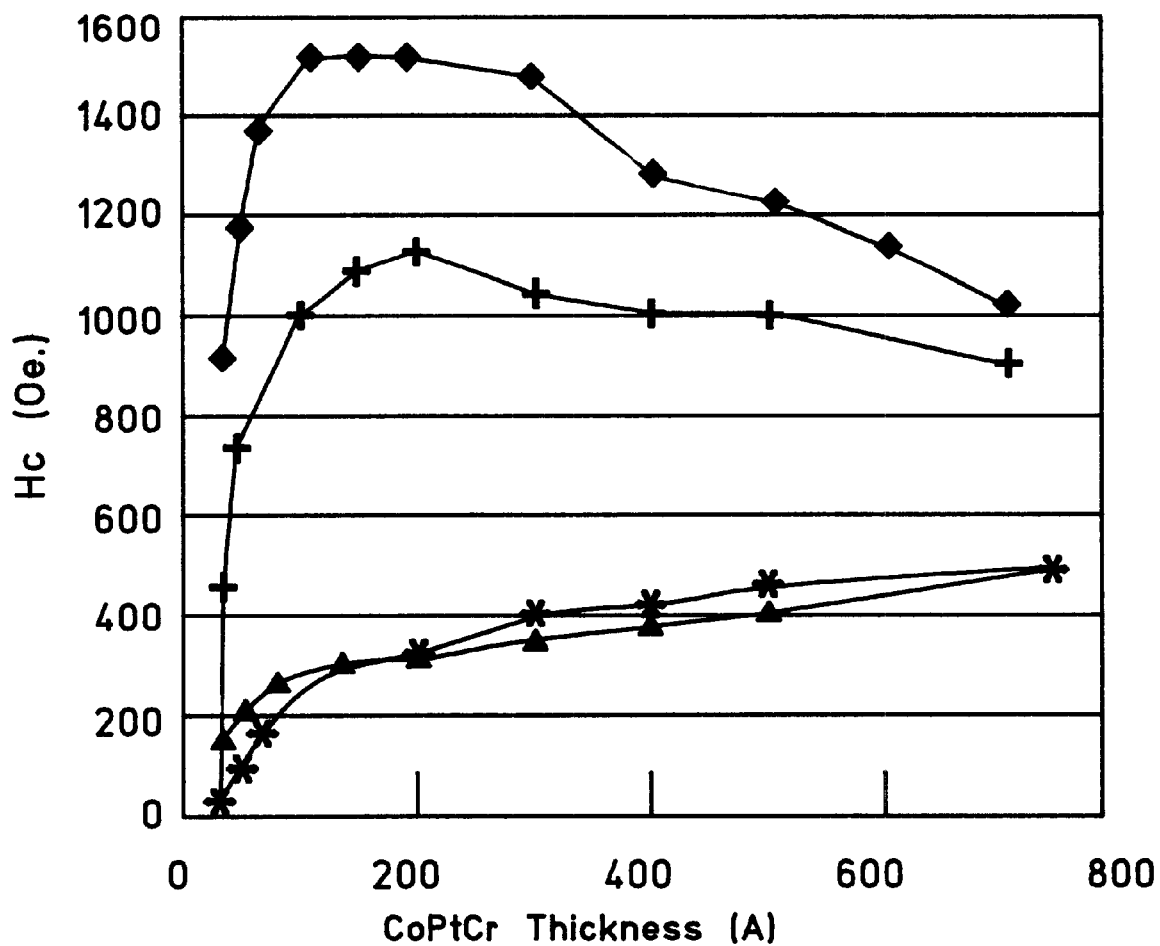
FIG. 2 is a graph illustrating the coercivity vs. thickness of a hard bias material, cobalt-platinum-chromium, when deposited on various other materials.
Figure 3:
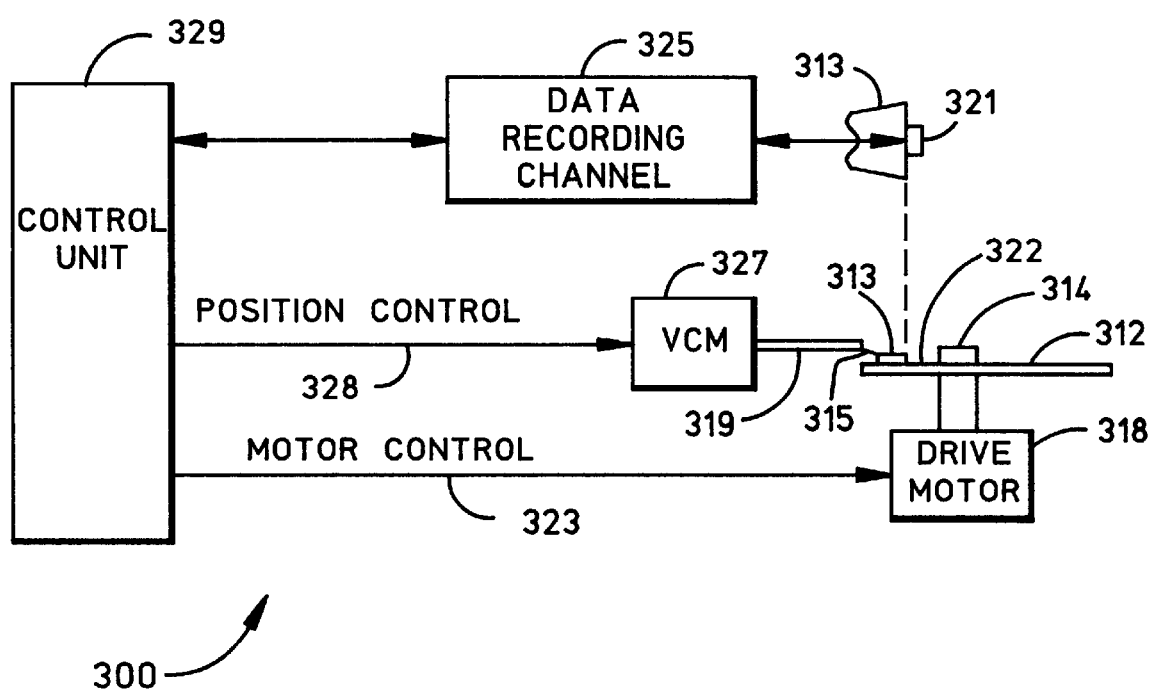
FIG. 3 is a block diagram of a magnetic recording disk drive system.

Referring to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting a magnetic read/write head 321 which incorporates the SV sensor of the present invention. As the disks rotate, slider 313 is moved radially in and out over disk surface 322 so that head 321 may access different portions of the disk where desired data is recorded. Each slider 313 is attached to an actuator arm 319 by means of a suspension 315. The suspension 315 provides a slight spring force which biases slider 313 against the disk surface 322. Each actuator arm 319 is attached to an actuator means 327. The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 (the surface of slider 313 which includes head 321 and faces the surface of disk 312 is referred to as an air bearing surface (ABS)) and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write head 321 by means of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
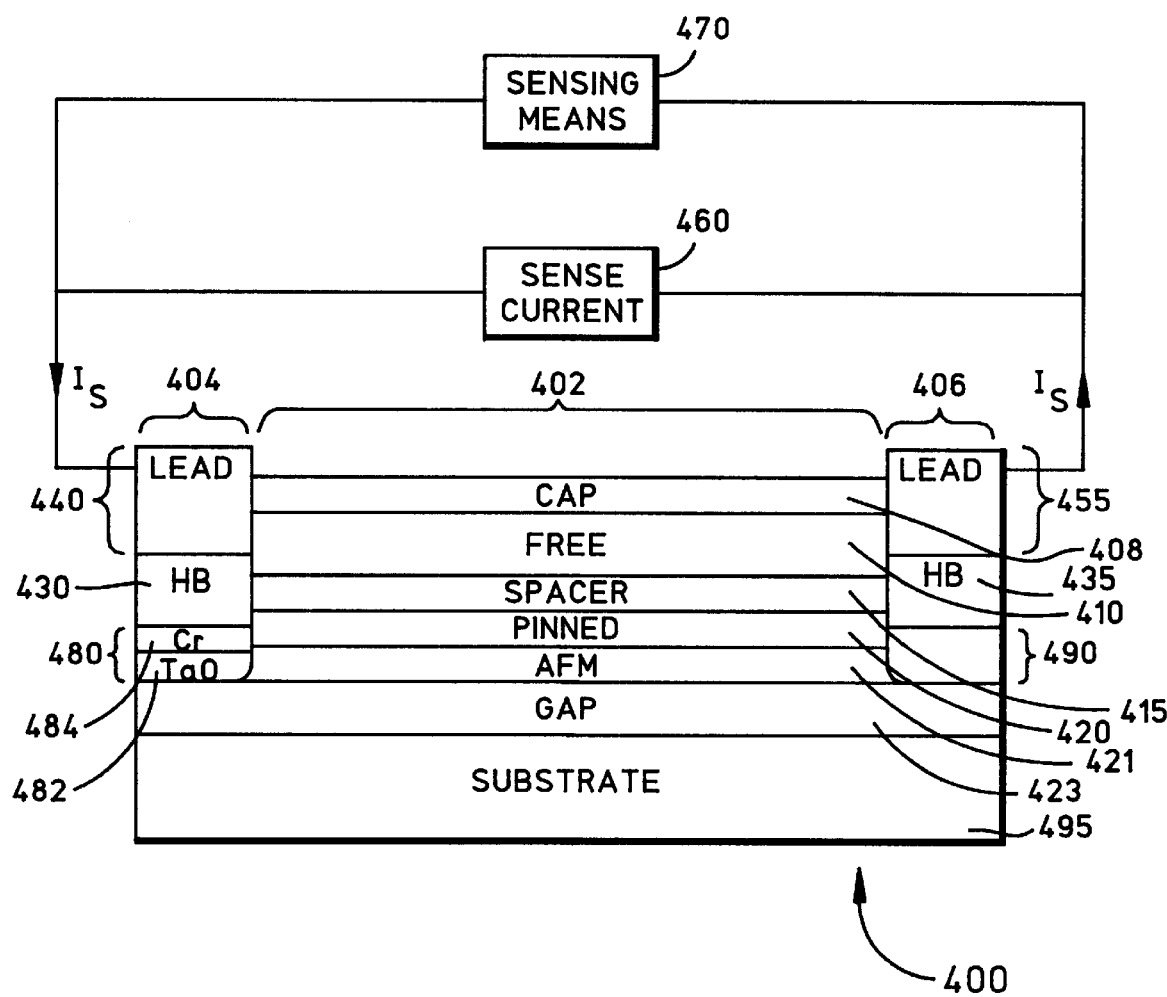
FIG. 4 is a schematic diagram of an ABS view of a thin film structure of a preferred embodiment spin valve (SV) sensor according to the present invention.

FIG. 4 shows an air bearing surface (ABS) view of the SV sensor 400 according to the preferred embodiment of the present invention. SV sensor 400 comprises end regions 404 and 406 separated by a central region 402. A free layer (free ferromagnetic layer) 410 is separated from a pinned layer (pinned ferromagnetic layer) 420 by a non-magnetic, electrically-conducting spacer layer 415. The magnetization of the pinned layer 420 is fixed by an antiferromagnetic (AFM) layer 421. Cap layer 408, free layer 410, spacer layer 415, pinned layer 420, and AFM layer 421 are all formed in central region 402.

Hard bias layers 430 and 435 formed in the end regions 404 and 406, respectively, and in contact with the spin valve sensor layers in the central region 402, provide longitudinal bias for free layer 410. Leads 440 and 445 formed over hard bias layers 430 and 435, respectively, provide electrical connections for the flow of the sensing current Isfrom a current source 460 to the SV sensor 400. Sensing means 470 connected to leads 440 and 445 sense the change in the resistance due to changes induced in the free layer 410 by the external magnetic field (e.g., field generated by a data bit stored on a disk).

In this embodiment, free layer 410 is formed of nickel-iron and cobalt-iron, pinned layer 420 is formed of cobalt-iron, and spacer layer 415 is formed of copper. Preferably, pinned layer 420 comprises a multi-layer film structure such as a first ferromagnetic layer/spacer/second ferromagnetic layer (e.g., cobalt-iron/ruthenium/cobalt-iron) where the first and second ferromagnetic layers are antiferromagnetically coupled by a spacer layer. AFM layer may be formed of platinum-manganese, iridium-manganese, and nickel-oxide.

Multi-layered seed layers 480 and 490, which in this embodiment are bi-layered seed layers, are formed in end regions 404 and 406, respectively. More particularly, multi-layered seed layers 480 and 490 are formed below hard bias layers 430 and 435, respectively, and generally adjacent to the read sensor in central region 402. Although not visible in FIG. 4, multi-layered seed layers 480 and 490 are formed over sensor tails of the read sensor in the contiguous junction regions. Multi-layered seed layer 480 has a first seed layer 482 and a second seed layer 484 formed on first seed layer 482. According to the invention, first seed layer 482 is oxidized tantalum and second seed layer 484 is chromium. Although not shown in FIG. 4, multi-layered seed layer 490 has the same first and second seed layers as multi-layered seed layer 480.

Thus, the magnetic head has a read sensor formed in central region 402, multi-layered seed layers 480 and 490 formed adjacent the read sensor and over first and second contiguous junction regions of the read sensor; and hard bias layers 430 and 435 formed over multi-layered seed layers 480 and 490. Each one of multi-layered seed layers 480 and 490 includes a first seed layer 482 comprising oxidized tantalum and a second seed layer 484 comprising chromium.

Figure 10:
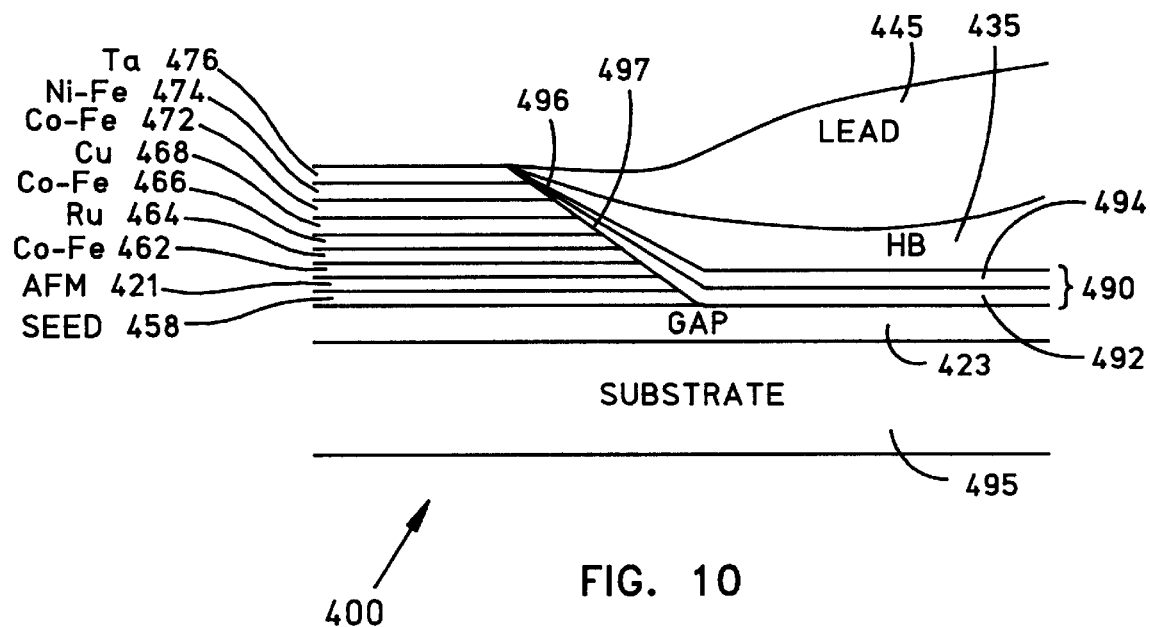
FIG. 10 is a close-up view of the ABS view of the preferred embodiment SV sensor of FIG. 4.

FIG. 10 is a close-up view is shown of SV sensor 400 of FIG. 4 with a contiguous junction 496 and a sensor tail 497. Sensor tail 497 includes several layers and materials including cobalt-iron 462, ruthenium 464, cobalt-iron 466, copper 468, cobalt-iron 472, nickel-iron 474, tantalum 476, as well as platinum-manganese, iridium-manganese, and nickel-oxide in AFM layer 421 and other materials of a sensor seed layer 458. Hard bias layer 435 is preferably a cobalt-based alloy such as cobalt-platinum-chromium. According to the invention, bi-layered seed layer 490 has a first seed layer 492 of oxidized tantalum and a second seed layer 494 of chromium. Advantageously, first and second seed layers 492 and 494 are relatively thin layers (e.g., each less than 30 Angstroms). As one example, first seed layer 492 of oxidized tantalum has a thickness of about 20 Angstroms and second seed layer 494 of chromium has a thickness of about 25 Angstroms.

Figure 5:
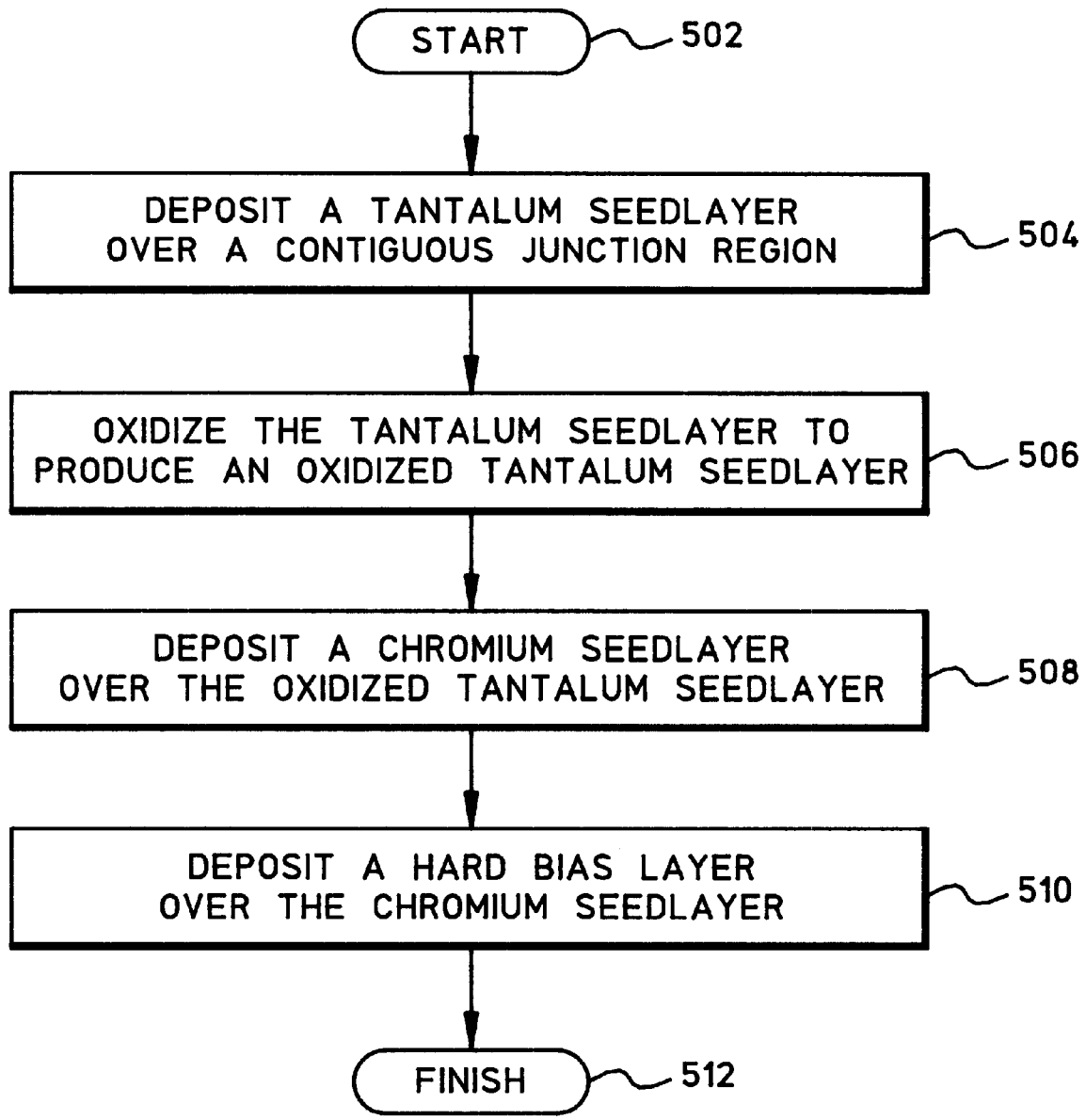
FIG. 5 is a flowchart describing a method of making an SV sensor according to the present invention.
Figure 6:
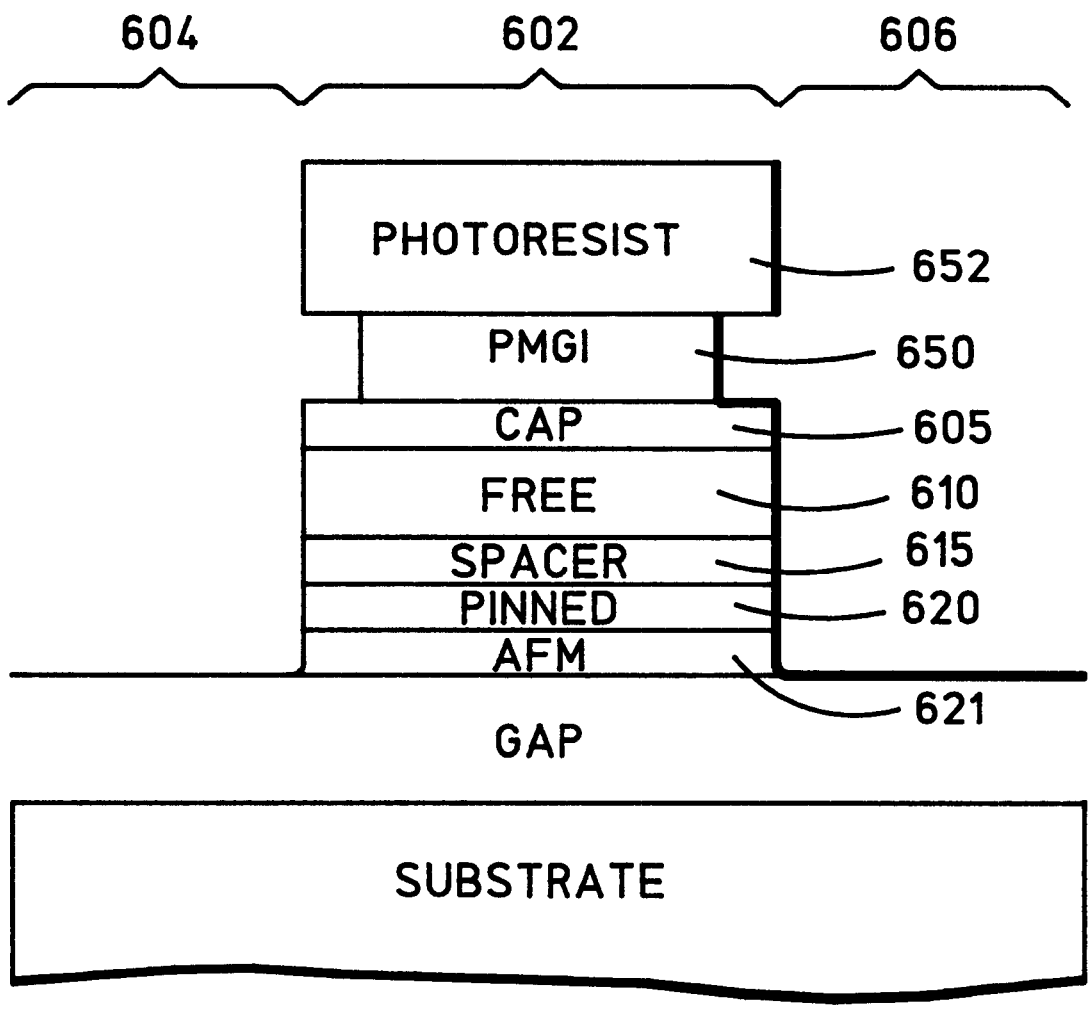
FIG. 6 shows an SV sensor at the processing step after ion milling definition of the active region of the sensor.

FIGS. 5–8 are illustrations relating to a method of making an SV sensor according to the present invention. Referring first to FIG. 6, a multi-layered SV sensor structure is shown, which illustrates the structure after the processing steps defining central region 602 have been completed. To reach this stage of the processing, the multi-layered SV sensor structure was deposited by successive ion beam sputtering depositions as is well established in the art.

Polydimethylglutarimide (PMGI) layer 650 is formed in between a photoresist layer 652 and a capping layer 605 in order to facilitate the lift-off process when removing photoresist 652. Photoresist 652 is laid-out over the multi-layers that comprise the active central region of the SV sensor. The photoresist masks the active region of the sensor during the ion beam milling and deposition process for the conductive lead structure to be deposited on end regions 604 and 606. The layers lying under the photoresist have been protected during the ion milling process and remain intact. The portions of an AFM layer 621, a pinned layer 620, a spacer layer 615, a free layer 610, and capping layer 605 that are not protected by the photoresist during the ion milling process are removed. The ion milling process can be stopped at any one of these layers. Although difficult to see in FIG. 6, sensor tails which extend toward end regions 604 and 606 are also formed during this process.

Figure 7:
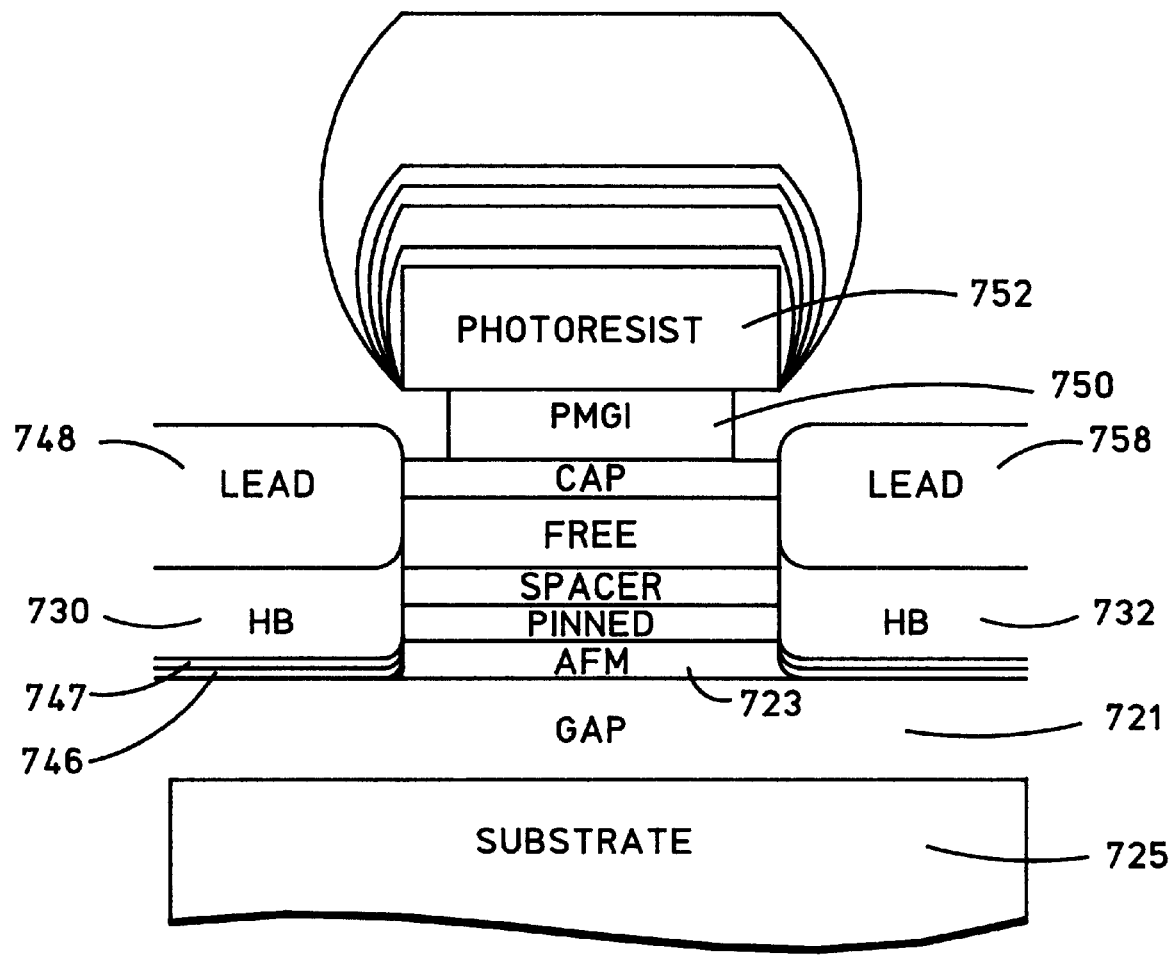
FIG. 7 shows an SV sensor after the processing steps of depositing the bi-layer seed layer, a hard biasing layer, and a conductor lead structure.

What is performed after the aforementioned processes is now described in relation to FIGS. 5 and 7. In FIG. 5, a flowchart describing a method of making an SV sensor according to the present invention is shown. In FIG. 7, an SV sensor after the bi-layered seed layers, the hard bias layers, and conductive lead layers have been deposited using ion beam sputtering deposition is shown.

Referring to FIGS. 5 and 7 in combination, and beginning at a start block 502 of FIG. 5, a tantalum layer 746 is deposited such that it overlays sensor tails, the continuous junction region, and a gap layer 721 formed over a substrate 725 (step 504). Preferably, tantalum layer 746 is deposited to a thickness between about 5 to 30 Angstroms, and preferably has a specific thickness of about 20 Angstroms.

Tantalum layer 746 is then oxidized by exposing its surface to oxygen such that an oxidized tantalum layer 746 is formed (step 506). The oxygenation process is applied for a short period of time such that it does not increase the contiguous junction resistance by any significant amount. The full tantalum layer 746 does not need to be oxidized. In this embodiment, the tantalum is exposed to a low level of oxygen using a $5 \times 10^{-5}$ Torr oxygen pressure for a time range of about 15 to 60 seconds, and preferably for about 30 seconds. By exposing the tantalum surface to oxygen in this way, the surface microstructure of tantalum layer 746 is changed. As a result, the microstructure of the chromium and hard bias which are subsequently deposited thereon will also be changed.

A chromium layer 747 is then deposited over this oxidized tantalum layer 746 (step 508). Preferably, chromium layer 747 is deposited to a thickness between 15–35 Angstroms, and preferably has a specific thickness of about 25 Angstroms. A hard bias layer 730 is then laid over chromium layer 747 (step 510). Preferably, hard bias layer 730 is a layer of suitable hard magnetic material, such as cobalt-platinum-chromium, that is deposited over the bi-layered seed layer. The hard magnet material may be any suitable cobalt-based alloy. The flowchart ends at a finish block 512, but additional conventional processing steps may be performed (such as depositing lead layers 748 and 758 over hard bias layers 730 and 732, respectively).

Figure 8:
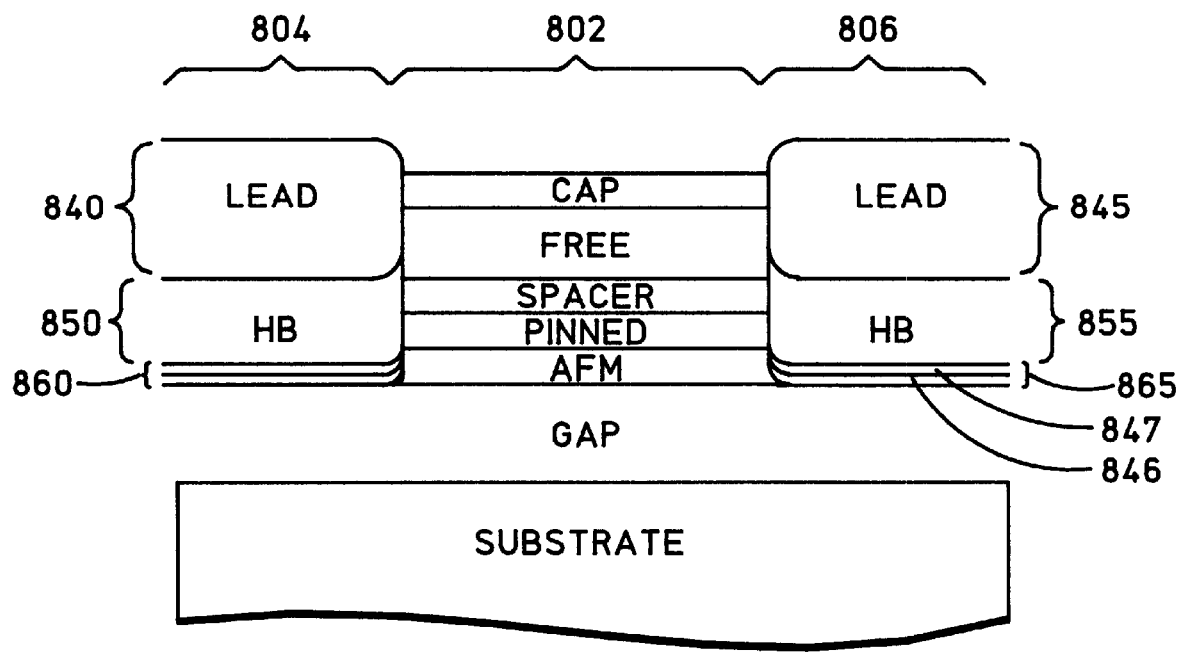
FIG. 8 shows an SV sensor having the bi-layer seed layer structure according to the present invention after the photoresist and PMGI have been lifted off.
Figure 9:
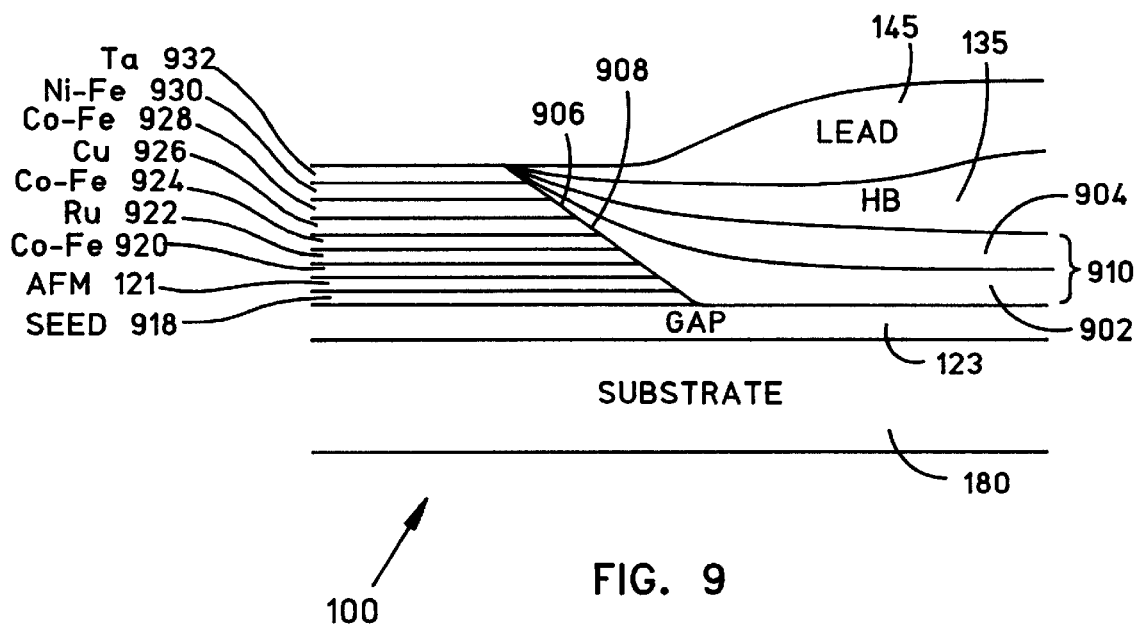
FIG. 9. is a close-up of an ABS view of a SV sensor having a thick bi-layer seed layer.

During the deposition process, lead layers 748 and 758 are formed over photoresist 752 and PMGI 750. However, at PMGI 750, a disconnect occurs because of photoresist 752 overhang. In the next process step, a solvent is introduced causing photoresist 752 to be lifted off. The solvent dissolves PMGI 750 to allow photoresist 752 and the hard bias and lead structure layers deposited thereon to be washed away. The result is the SV sensor structure of FIG. 8. As shown in FIG. 8, the SV sensor has an active SV structure formed in central region 802, and conductive lead layers 840 and 845 and hard bias layers 850 and 855 formed in end regions 804 and 806, respectively. Thin multi-layered seed layers 860 and 865 are formed below hard bias layers 850 and 855, respectively, in end regions 804 and 806. Similar to multi-layered seed layer 860, multi- layered seed layer 865 also has a first seed layer 846 of oxidized tantalum and a second seed layer 847 of chromium.

Table 1 below compares data from the use of a chromium (35 Angstroms)/cobalt-platinum-chromium (200 Angstroms) structure versus a tantalum-oxide (15Angstroms)/chromium (25 Angstroms)/cobalt-platinum-chromium (200 Angstroms) structure.

TABLE 1

Comparison of Coercivity.

| Seed | $H_c$ (Oe.) with use of Cr/CoPtCr | $H_c$ (Oe.) with use of Ta—O/Cr/CoPtCr |
| --- | --- | --- |
| NiFe (20 A) | 342 | 700 |
| NiFeCr (20 A) | 321 | 744 |

As the data show, the hard magnet properties are improved with use of the inventive bi-layer seed layer.

Table 2 below provides data relating to the insensitivity of the hard magnet coercivity to the thickness of the bi-layered seed layer. Here, an oxidized tantalum (X Angstroms)/chromium (25 Angstroms)/cobalt-platinum-chromium (200 Angstroms) structure was utilized on a nickel-iron material (25 Angstroms).

TABLE 2

Insensitivity of Hard Magnet Coercivity to Tantalum Thickness.

| Ta—O (X Angstroms) | $H_c$ (Oe.) |
| --- | --- |
| 5 | 720 |
| 10 | 700 |
| 15 | 700 |
| 20 | 710 |
| 25 | 700 |

Thus, a magnetic head having improved hard magnet properties has been described. The magnetic head has a read sensor; a multi-layered seed layer formed adjacent the read sensor and over a contiguous junction region of the read sensor; and a hard bias layer formed over the multi-layered seed layer. The multi-layered seed layer includes a first seed layer comprising oxidized tantalum; and a second seed layer comprising chromium. The hard bias layer is made from a cobalt-based alloy, such as cobalt-platinum-chromium. The contiguous junction region exposes one or more sensor materials such as tantalum, nickel-iron, cobalt-iron, copper, platinum-manganese and ruthenium. Preferably, the first seed layer has a thickness of less than 30 Angstroms and the hard bias layer produces a coercivity of about 700 Oersteds or higher. A lead layer may be formed over the hard bias layer.

A magnetic recording device may embody such a magnetic head. The magnetic recording device has at least one rotatable magnetic disk; a spindle supporting the at least one rotatable magnetic disk; a disk drive motor for rotating the at least one rotatable magnetic disk; a magnetic head for reading data from the at least one rotatable magnetic disk; and a slider for supporting the magnetic head. The magnetic head has a read sensor; a multi-layered seed layer formed adjacent the read sensor and over a contiguous junction region of the read sensor; and a hard bias layer formed over the multi-layered seed layer. The multi-layered seed layer includes a first seed layer comprising oxidized tantalum and a second seed layer comprising chromium. The hard bias layer is made from a cobalt-based alloy, such as cobalt-platinum-chromium. The contiguous junction region exposes one or more sensor materials such as tantalum, nickel-iron, cobalt-iron, copper, platinum-manganese and ruthenium.

Finally, a method of producing a magnetic head includes the acts of forming an oxidized tantalum seed layer adjacent to a read sensor and over a contiguous junction region of the read sensor by depositing a tantalum layer adjacent to and over the contiguous junction region and then oxidizing the tantalum seed layer to produce the oxidized tantalum seed layer; depositing a chromium seed layer over the oxidized tantalum seed layer; and depositing a hard bias layer over the chromium seed layer. The contiguous junction region exposes one or more sensor materials such as tantalum, nickel-iron, cobalt-iron, copper, platinum-manganese and ruthenium. The act of depositing the tantalum layer adjacent to and over the contiguous junction regions involves depositing a tantalum layer of less than 30 Angstroms. The act of depositing the hard bias layer involves depositing a hard bias layer of cobalt-platinum-chromium. The method may include the further act of depositing a lead layer over the hard bias layer.

Advantageously, by utilizing a bi-layered seed layer consisting of oxidized tantalum and chromium over a contiguous junction region of a read sensor, the hard bias material exhibits improved properties: an increase in coercivity from 340 Oersteds to 700 Oersteds or higher. The bi-layered seed layer need not be a thick layer, but can be relatively thin as the high-level of coercivity achieved is fairly insensitive to tantalum thickness.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A magnetic head, comprising:
   a read sensor;
   a multi-layered seed layer formed adjacent to the read sensor and over a contiguous junction region of the read sensor;
   the multi-layered seed layer including:
      a first seed layer comprising oxidized tantalum;
      a second seed layer comprising chromium; and
   a hard bias layer formed over the multi-layered seed layer.

2. The magnetic head of claim 1, wherein the hard bias layer is a cobalt-based alloy.

3. The magnetic head of claim 1, wherein the hard bias layer includes cobalt-platinum-chromium.

4. The magnetic head of claim 1, wherein the contiguous junction region exposes one or more sensor materials from the group of tantalum, nickel-iron, cobalt- iron, copper, platinum-manganese and ruthenium.

5. The magnetic head of claim 1, wherein the hard bias layer is cobalt-platinum-chromium and the contiguous junction region exposes one or more sensor materials from the group of tantalum, nickel-iron, cobalt-iron, copper, platinum-manganese and ruthenium.

6. The magnetic head of claim 5, wherein the first seed layer has a thickness less than 30 Angstroms and the hard bias layer produces a coercivity of about 700 Oersteds or higher.

7. The magnetic head of claim 6, further comprising:
   a lead layer formed over the hard bias layer.

8. A magnetic recording device, comprising:
   at least one rotatable magnetic disk;
   a spindle supporting the at least one rotatable magnetic disk;
   a disk drive motor for rotating the at least one rotatable magnetic disk;
   a magnetic head for reading data from the at least one rotatable magnetic disk;
   a slider for supporting the magnetic head;
   the magnetic head including:
      a read sensor;
      a multi-layered seed layer formed adjacent the read sensor and over a contiguous junction region of the read sensor;
      a hard bias layer formed over the multi-layered seed layer;
      the multi-layered seed layer including:
         a first seed layer comprising oxidized tantalum; and
         a second seed layer comprising chromium.

9. The magnetic recording device of claim 8, wherein the hard bias layer of the magnetic head is a cobalt-based alloy.

10. The magnetic recording device of claim 8, wherein the hard bias layer of the magnetic head includes cobalt-platinum-chromium.

11. The magnetic recording device of claim 8, wherein the contiguous junction region exposes one or more sensor materials from the group of tantalum, nickel-iron, cobalt-iron, copper, platinum-manganese and ruthenium.

12. The magnetic recording device of claim 8, wherein the hard bias layer is cobalt-platinum-chromium and the contiguous junction region exposes one or more sensor materials from the group of tantalum, nickel-iron, cobalt-iron, copper, platinum-manganese and ruthenium.

13. The magnetic recording device of claim 12, wherein the first seed layer has a thickness less than 30 Angstroms and the hard bias layer produces a coercivity of about 700 Oersteds or higher.

14. The magnetic recording device of claim 12, further comprising:
   a lead layer formed over the hard bias layer.

15. A method of producing a magnetic head, comprising:
   forming an oxidized tantalum seed layer adjacent to a read sensor and over a contiguous junction region of the read sensor by:
      depositing a tantalum layer adjacent to and over the contiguous junction region;
      oxidizing the tantalum seed layer to produce the oxidized tantalum seed layer;
   depositing a chromium seed layer over the oxidized tantalum seed layer; and
   depositing a hard bias layer over the chromium seed layer.

16. The method of claim 15, wherein the act of depositing the hard bias layer comprises depositing a hard bias layer of cobalt-platinum-chromium.

17. The method of claim 15, wherein the act of forming the oxidized tantalum seed layer over the contiguous junction region comprises a contiguous junction region exposing one or more sensor materials from the group of tantalum, nickel-iron, cobalt-iron, copper, platinum-manganese and ruthenium.

18. The method of claim 15, wherein the act of forming the oxidized tantalum seed layer over the contiguous junction region comprises a contiguous junction region exposing one or more sensor materials from the group of tantalum, nickel-iron, cobalt-iron, copper, platinum-manganese and ruthenium, and wherein the act of depositing the hard bias layer comprises depositing a hard bias layer of cobalt-platinum-chromium.

19. The method of claim 18, wherein the act of depositing the tantalum layer adjacent to and over the contiguous junction region comprises depositing a tantalum layer of less than 20 Angstroms and the act of oxidizing the tantalum layer comprises oxidizing the tantalum layer sufficiently so that a resistance of the contiguous junction region does not increase significantly.

20. The method of claim 19, further comprising:

depositing a lead layer over the hard bias layer.

* * * * *